US012626351B2

(12) United States Patent
Kang et al.

(10) Patent No.: US 12,626,351 B2
(45) Date of Patent: May 12, 2026

(54) IMAGE PROCESSING METHOD AND SYSTEM THEREOF

(71) Applicant: SAMSUNG ELECTRONICS CO., LTD., Suwon-si (KR)

(72) Inventors: Min Su Kang, Suwon-si (KR); Jang Hoon Kim, Suwon-si (KR); Woo Jin Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 329 days.

(21) Appl. No.: 18/141,690

(22) Filed: May 1, 2023

(65) Prior Publication Data

US 2024/0005476 A1 Jan. 4, 2024

(30) Foreign Application Priority Data

Jul. 4, 2022 (KR) ........................ 10-2022-0081954

(51) Int. Cl.
  *G06T 7/00* (2017.01)
  *G06T 7/13* (2017.01)
(52) U.S. Cl.
  CPC .............. *G06T 7/0006* (2013.01); *G06T 7/13* (2017.01); *G06T 2207/10061* (2013.01); *G06T 2207/30148* (2013.01)
(58) Field of Classification Search
  CPC .................... G06T 7/0006; G06T 7/13; G06T 2207/10061; G06T 2207/30148; G06T 2207/20081; G06T 2207/20084; G06T 7/0004; G06T 7/136; G06T 7/12; G06T 5/40; G06T 5/90; G06T 7/62; G06T 7/70; G06N 20/00
  See application file for complete search history.

(56) References Cited

U.S. PATENT DOCUMENTS 6,788,825 B1 9/2004 Fujino
7,386,186 B2 6/2008 Ovsiannikov
(Continued)

OTHER PUBLICATIONS

Sh Lee et al. "Automated Diagonal Slice and View Solution for 3D Device Structure Analysis" Jan. 1, 2018, pp. 224-231, XP009521978.
(Continued)

*Primary Examiner* — Jennifer Mehmood
*Assistant Examiner* — Vaisali Rao Koppolu
(74) *Attorney, Agent, or Firm* — Sughrue Mion, PLLC

(57) ABSTRACT

An image processing system, including an input interface configured to receive a first direction image corresponding to a view of a semiconductor device in a first direction, and a second direction image corresponding to a view of the semiconductor device in a second direction which intersects the first direction at a first height at which the first direction image is generated; a processor configured to perform an edge detection operation for detecting an edge based on the first direction image, and to perform an image binarization operation on the first direction image; and a learning device configured to compare a first line width obtained based on the image binarization operation, and a second line width obtained based on the second direction image through machine learning, and to learn a condition of the image binarization operation which maximizes a correlation between the first line width and the second line width.

21 Claims, 15 Drawing Sheets

ADI_img(c)

CH2b

702

(56)                    References Cited

U.S. PATENT DOCUMENTS

| | | | |
|---|---|---|---|
| 8,260,057 B2 | 9/2012 | Hasegawa et al. | |
| 9,547,909 B2 | 1/2017 | Du et al. | |
| 10,127,651 B2 | 11/2018 | Kulkarni et al. | |
| 10,423,854 B2 | 9/2019 | Yamada | |
| 10,452,905 B2 | 10/2019 | Segalovitz et al. | |
| 10,921,262 B2 | 2/2021 | Zhang et al. | |
| 2015/0287201 A1* | 10/2015 | Shinoda | G06T 7/337 |
| | | | 382/144 |
| 2018/0088060 A1* | 3/2018 | Shim | G03F 7/70633 |
| 2020/0134824 A1 | 4/2020 | Adiga | |
| 2022/0027622 A1 | 1/2022 | Taylor et al. | |
| 2022/0092799 A1* | 3/2022 | Yan | G06T 5/70 |
| 2022/0138973 A1 | 5/2022 | Korb et al. | |
| 2023/0360190 A1* | 11/2023 | Kitao | G06T 7/12 |
| 2024/0144560 A1* | 5/2024 | Cheng | H01L 22/00 |

OTHER PUBLICATIONS

Ming Zeng et al. "Image Thresholding Based on edge Information Analysis", Image and Signal processing (CISP), 2012 5th International Congress (Oct. 16, 2012), pp. 1371-1375, XP032336585.
Extended European Search Report dated Oct. 16, 2023 issued by the European Patent Office in Counterpart European Application No. 23 173 898.0.
Communication dated Oct. 27, 2023 issued by the European Patent Office in counterpart European Application No. 23 173 898.0.

\* cited by examiner

ACI_img(c)

CH1b

CH1b

402~

ADI_img(c)

CH2b

702

Graph I

Graph II

CH2b

702

ADI_img(d)_1

Inner region 1101    Outer region 1102

ADI_img(d)_2

1400

S100 — Conducting edge detection

S200 — Find brightness threshold value with defined ratio

S300 — Compare line width of image with first direction and line width of image with second direction and find maximum ratio using machine learning S400 — Store image processing data

100

200 — Communication Interface

300 — Input Interface

400 — Learning Device

500 — Processor

600 — Memory

700 — Output Interface

IMAGE PROCESSING METHOD AND SYSTEM THEREOF

CROSS-REFERENCE TO RELATED APPLICATION

This application is based on and claims priority under 35 U.S.C. § 119 to Korean Patent Application No. 10-2022-0081954 filed on Jul. 4, 2022 in the Korean Intellectual Property Office, the disclosure of which of which is incorporated by reference herein in its entirety.

BACKGROUND

1. Field

The disclosure relates to an image processing method and a system thereof.

2. Description of Related Art

In recent years, as semiconductor devices have become highly integrated, the size of element inside a chip and the interval between the elements have been decreasing. Conversely, the decrease in the size of elements and decrease in the interval between the elements are a matter of being able to achieve high integration of the semiconductors. The high integration and high speed may be important not only in a memory field but also in a non-memory field. In a logic device such as a Central Processing Units (CPUs), the speed of the element may be increased by reducing dimensions such as a gate line width, which may be a width of a gate electrode, to achieve high speed of the signal. It may be important to adjust the gate line width for the high integration and speed improvement.

SUMMARY

Provided is an image processing system in which reliability of line width measured on the basis of an image during process of a semiconductor device is improved.

Provided is an image processing method in which reliability of line width measured on the basis of an image during process of a semiconductor device is improved.

Additional aspects will be set forth in part in the description which follows and, in part, will be apparent from the description, or may be learned by practice of the presented embodiments.

In accordance with an aspect of the disclosure, an image processing system includes an input interface configured to receive a first direction image corresponding to a view of a semiconductor device in a first direction, and a second direction image corresponding to a view of the semiconductor device in a second direction which intersects the first direction at a first height at which the first direction image is generated; a processor configured to perform an edge detection operation for detecting an edge based on the first direction image, and to perform an image binarization operation on the first direction image; and a learning device configured to compare a first line width obtained based on the image binarization operation, and a second line width obtained based on the second direction image through machine learning, and to learn a condition of the image binarization operation which maximizes a correlation between the first line width and the second line width.

In accordance with an aspect of the disclosure, an image processing system includes communication interface configured to communicate with an outside of the image processing system; an input interface configured to receive a first direction image corresponding to a view of a semiconductor device in a first direction, and a second direction image corresponding to a view of the semiconductor device in a second direction intersecting the first direction at a first height at which the first direction image is generated, through the communication interface; a learning device configured to perform machine learning based on the first direction image and the second direction image; a memory configured to store a machine learning model for performing the machine learning; and a processor configured to control the communication interface, the input interface, the learning device, and the memory, wherein the processor is further configured to: perform an edge detection operation for detecting an edge based on the first direction image, perform an image binarization operation on the first direction image, compare a first line width obtained based on the image binarization operation with a second line width obtained based on the second direction image using the machine learning, and learn a condition of the image binarization operation at which a correlation between the first line width and the second line width is maximized, using the learning device.

In accordance with an aspect of the disclosure, an image processing method includes receiving a first direction image corresponding to a view of a semiconductor device in a first direction, and a second direction image corresponding to a view of the semiconductor device in a second direction intersecting the first direction at a first height at which the first direction image is generated through an input interface; performing an edge detection operation for detecting an edge based on the first direction image, using a processor; performing an image binarization operation on the first direction image, using the processor; and comparing a first line width obtained based on the image binarization operation, and a second line width obtained based on the second direction image using machine learning, and learning a condition of the image binarization operation which maximizes a correlation between the first line width and the second line width, using a learning device.

In accordance with an aspect of the disclosure, an image processing device includes a memory; and at least one processor configured to: obtain a first direction image corresponding to a view of a semiconductor device in a first direction at a first height, and a second direction image corresponding to a view of the semiconductor device in a second direction which intersects the first direction at the first height; detect an edge based on the first direction image; perform binarization on the first direction image to obtain a binarized first direction image; and compare, using machine learning, a first line width obtained based on the binarized first direction image, and a second line width obtained based on the second direction image; learn a binarization condition which maximizes a correlation between the first line width and the second line width, based on the machine learning; and store the binarization condition in the memory.

However, aspects of the present invention are not restricted to the one set forth herein. The above and other aspects of the present invention will be more apparent to one of ordinary skill in the art to which the present invention pertains by referencing the detailed description of the present invention given below.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
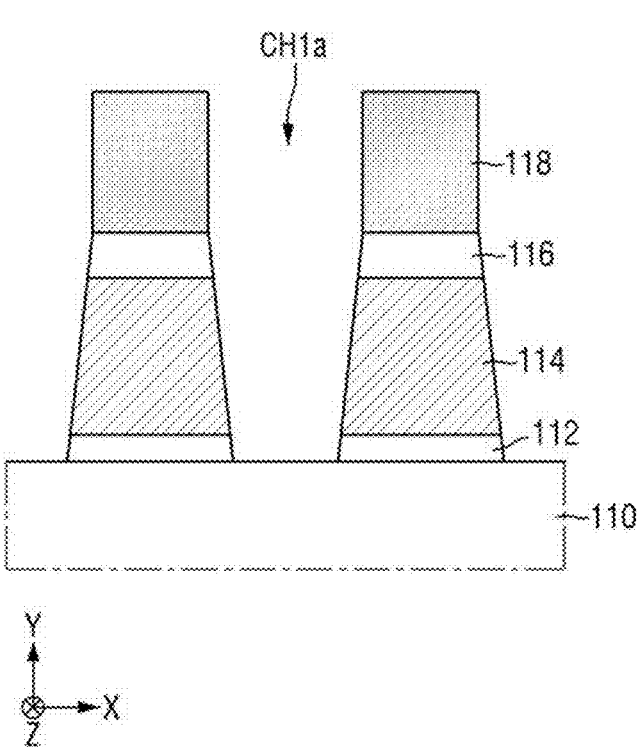
FIG. 1 is a cross-sectional view of a semiconductor device at some steps in the process steps for the semiconductor device, showing After Clean Inspection (ACI) images as an example, according to some embodiments.

Embodiments described herein with reference to terms such as units, modules, blocks, -or, and -er used in the detailed description and functional blocks shown in the drawings may be implemented by software or hardware or in the combined forms thereof. As an example, software may be machine code, firmware, embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element or combinations thereof.

As is traditional in the field, the example embodiments may be described and illustrated in terms of blocks which carry out a described function or functions. These blocks, which may be referred to herein as units, devices, systems modules, circuits, blocks, interfaces, or the like, are physically implemented by analog or digital circuits such as logic gates, integrated circuits, microprocessors, microcontrollers, memory circuits, passive electronic components, active electronic components, optical components, hardwired circuits, or the like, and in embodiments may be driven by firmware. The circuits may, for example, be embodied in one or more semiconductor chips, or on substrate supports such as printed circuit boards and the like. The circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of embodiments may be physically separated into two or more interacting and discrete blocks without departing from the scope of the disclosure. Likewise, the blocks of embodiments may be physically combined into more complex blocks without departing from the scope of the disclosure.

FIG. 1 is a cross-sectional view of a semiconductor device at some steps in the process steps corresponding to the semiconductor device, showing After Clean Inspection (ACI) images as an example.

Referring to FIG. 1, an image ACI_img(a) during some steps of a plurality of process steps for fabricating a semiconductor device is shown.

The image (ACI_img(a) may be or represent, for example, an image obtained through a Scanning Electron Microscope (SEM) or an image obtained through a Transmission Electron Microscope (TEM).

The image ACI_img(a) may be, for example, an image showing a result of some of the process steps in which a pad oxide layer 112, a polysilicon layer 114, an ARL 116, and a photoresist layer 118 are formed on a substrate 110.

In embodiments, the semiconductor device in the process described herein may be applied to other process steps.

In embodiments, the image ACI_img(a) of the semiconductor device shown in FIG. 1 may be an ACI image, after the pad oxide layer 112, the polysilicon layer 114, the ARL 116, and the photoresist layer 118 are etched.

That is, after etching the pad oxide layer 112, the polysilicon layer 114, ARL 116, and the photoresist layer 118, a channel hole CH1a may be formed.

An image of the semiconductor device shown in FIG. 1 viewed at any height in a second direction y may be generated. An example of a top view of the semiconductor device shown in FIG. 1 is described below with reference to FIG. 2.

Figure 2:
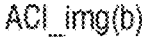
FIG. 2 is a top view of the semiconductor device at some steps of the process steps for the semiconductor device showing the ACI image as an example, according to some embodiments.
Figure 2:
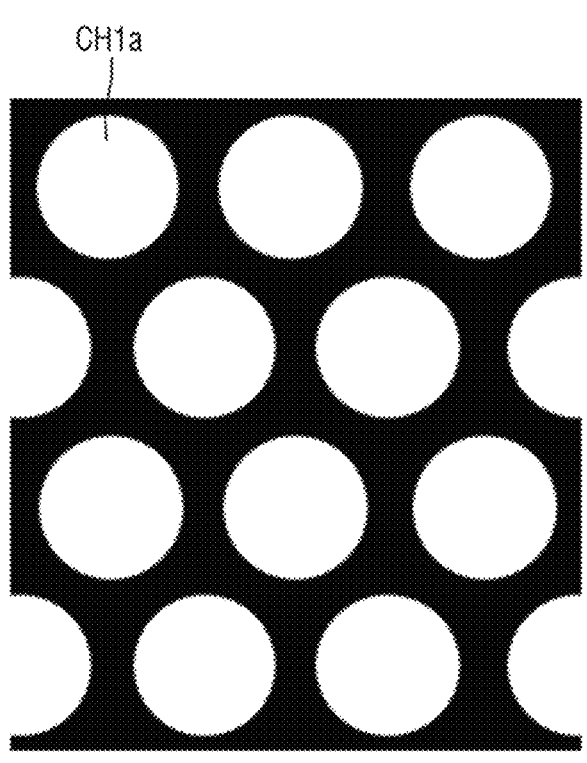
Figure 2:

FIG. 2 is a top view of the semiconductor device at some steps of the process steps for the semiconductor device showing the ACI image as an example.

Referring to FIGS. 1 and 2, the top view ACI_img(b) of the semiconductor device of FIG. 1 may include a plurality of channel holes.

The top view ACI_img(b) may be or represent, for example, an image obtained through a SEM or an image obtained through a TEM.

The channel hole CH1a may be, for example, a channel hole CH1a of FIG. 1.

The top view ACI_img(b) may be an image captured after the photoresist layer 118 is etched, and a noise due to the photoresist layer 118 is not generated.

As shown in FIG. 2, an edge between the plurality of channel holes may be clear.

In embodiments, an edge detection operation for the top view ACI_img(b) may be performed for line width measurement of the semiconductor device shown in FIG. 1. An example diagram after the edge detection operation is performed on the top view ACI_img(b) is described below with respect to FIG. 3.

Figure 3:
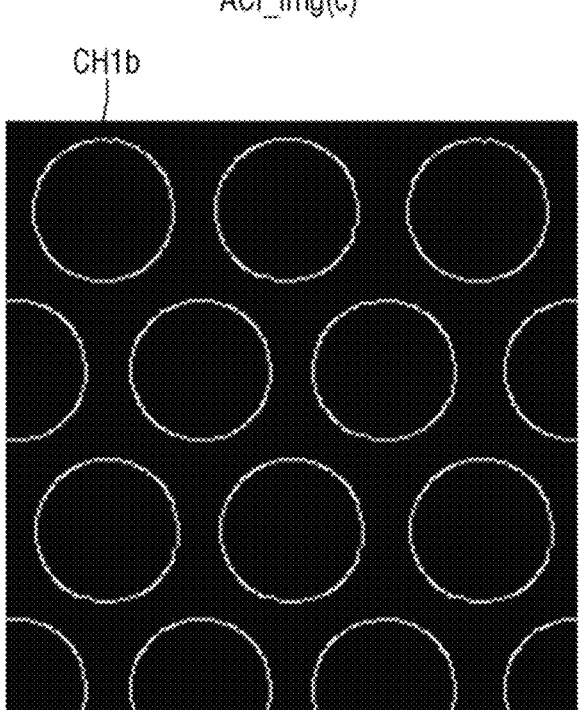
FIG. 3 is a top view showing an image in which the edge detection operation is performed on the image of FIG. 2 and the edge is detected, according to some embodiments.
Figure 3:

FIG. 3 is a top view showing an image in which the edge detection operation is performed on the image of FIG. 2 and the edge is detected.

Referring to FIG. 3, a diagram ACI_img(c) after the edge detection operation has been performed on the top view ACI_img(b) of FIG. 2 is shown.

The edge detection operation is performed on the basis of brightness information depending on the position of the pixels of the top view ACI_img(b) of FIG. 2. Because a detailed description of the edge detection operation is provided below through FIGS. 8 and 9, it is described briefly with respect to FIG. 2.

An edge detected on the basis of brightness information depending on the position of the pixels of the top view ACI_img(b) of FIG. 2 is shown in the image ACI_img(c). That is, the image ACI_img(c) may be displayed by being divided into two regions or portions, for example an edge portion and a non-edge portion.

In embodiments, the image ACI_img(c) is an image generated on the basis of the top view ACI_img(b) of FIG. 2, and since the top view ACI_img(b) of FIG. 3 is an image which is captured after etching the photoresist layer 118 and in which no noise caused by the photoresist layer 118 is generated, the edges for defining the plurality of channels may appear clearly.

In order to check in more detail the edges that define the plurality of channels, the position at which the channel hole CH1*b* exists explained below with respect to FIG. 4.

Figure 4:
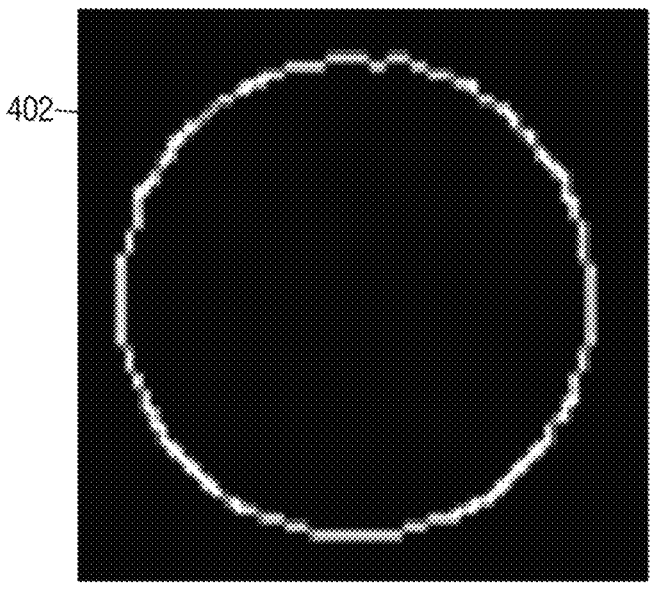
FIG. 4 is an enlarged view showing an enlarged part of the image of FIG. 3, according to some embodiments.
Figure 4:
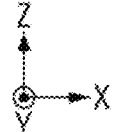

FIG. 4 is an enlarged view showing an enlarged part of the image of FIG. 3.

Referring to the image of FIG. 4, the edge 402 defining the channel hole CH1*b* may be clearly defined. For example, the edge 402 defining the channel hole CH1*b* may have a closed curve shape.

This is because the top view ACI_img(b) of FIG. 2 is an image which is captured after etching the photoresist layer 118, and in which noise due to the photoresist layer 118 is not generated.

In the examples described with respect to FIGS. 1 to 4, the line width, more specifically, the line width of the channel hole, may be measured with high accuracy.

However, there may be a case where the top view includes a a relatively large amount of noise, for example more noise than is shown in FIGS. 2 to 3, and the edge of the image generated after the edge detection is not clear. In this case, the line width, for example the line width of the channel hole, may be measured with low accuracy. In this case, it is possible to improve the measurement accuracy of the line width, more particularly, the line width of the channel holes through the image processing system or image processing method according to some embodiments.

A case where the top view includes a relatively large amount of noise and the edge of the image generated after the edge detection is not clear is described with respect to FIGS. 5 to 10 below.

Figure 5:
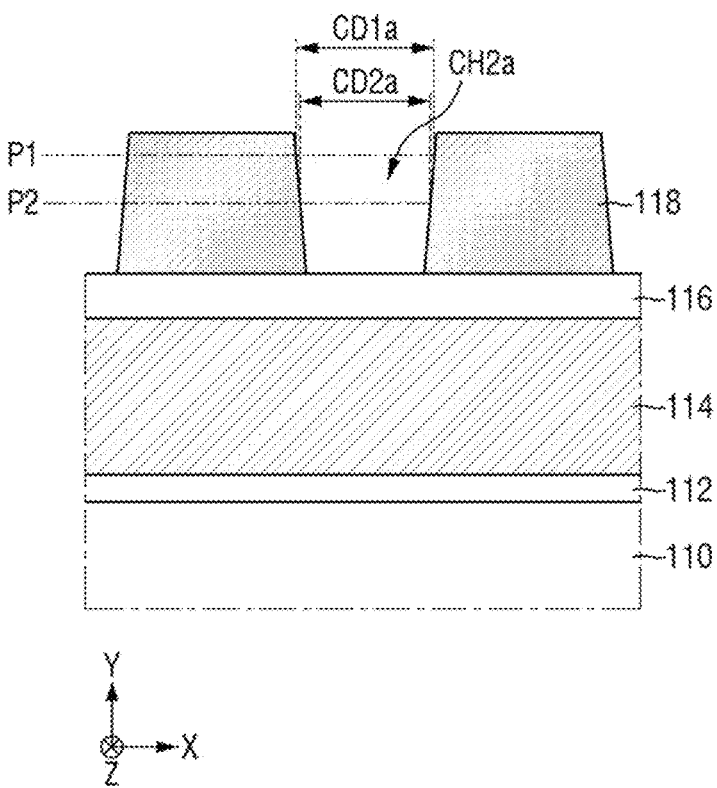
FIG. 5 is a cross-sectional view of a semiconductor device at some steps of the process steps for the semiconductor device, showing After Development Inspection (ADI) images as an example, according to some embodiments.

FIG. 5 is a cross-sectional view of a semiconductor device at some steps of the process steps for the semiconductor device, showing After Development Inspection (ADI) images as an example.

Referring to FIG. 5, an image ADI_img(a) during some step processes of the plurality of process steps for fabricating the semiconductor device is shown.

The image ADI_img(a) may be or represent, for example, an image obtained through a SEM or an image obtained through a TEM.

The image ADI_img(a) may be or represent, for example, an image showing a result of some of the process steps in which the pad oxide layer 112, the polysilicon layer 114, ARL 116, and the photoresist layer 118 are formed on the substrate 110.

In embodiments, the semiconductor device in the process described herein may be applied to other process steps.

In embodiments, the image ADI_img(a) of the semiconductor device shown in FIG. 5 may be an ADI image, before etching the pad oxide layer 112, the polysilicon layer 114, ARL 116, and the photoresist layer 118. That is, the image ADI_img(a) of the semiconductor device shown in FIG. 5 may be an image of the semiconductor device in during a process in which there is a mask formed after a photograph process.

That is, the channel hole CH2*a* may be formed between the photoresist layers 118 on the pad oxide layer 112, the polysilicon layer 114, and ARL 116.

The channel hole CH2*a* may be referred to as a channel hole during the process of forming the channel hole which is formed before the pad oxide layer 112, the polysilicon layer 114, and ARL 116 are etched.

In embodiments, the line width of the channel hole CH2*a* may vary according to the height in the second direction y.

For example, a line width at a first height P1 in the second direction y may have a first line width CD1*a*. Also, a line width at a second height P2 in the second direction y may have a second line width CD2*a*.

The first line width CD1*a* and the second line width CD2*a* may be different from each other. For example, the second line width CD2*a* may be smaller than the first line width CD1*a*.

For reference, the line widths (e.g., the first line width CD1*a* and the second line width CD2*a*) may be sizes measured on a plane in the first direction x and the third direction z. The line widths (e.g., the first line width CD1*a* and the second line width CD2*a*) in this drawing may be sizes extending in the first direction x.

Figure 6:
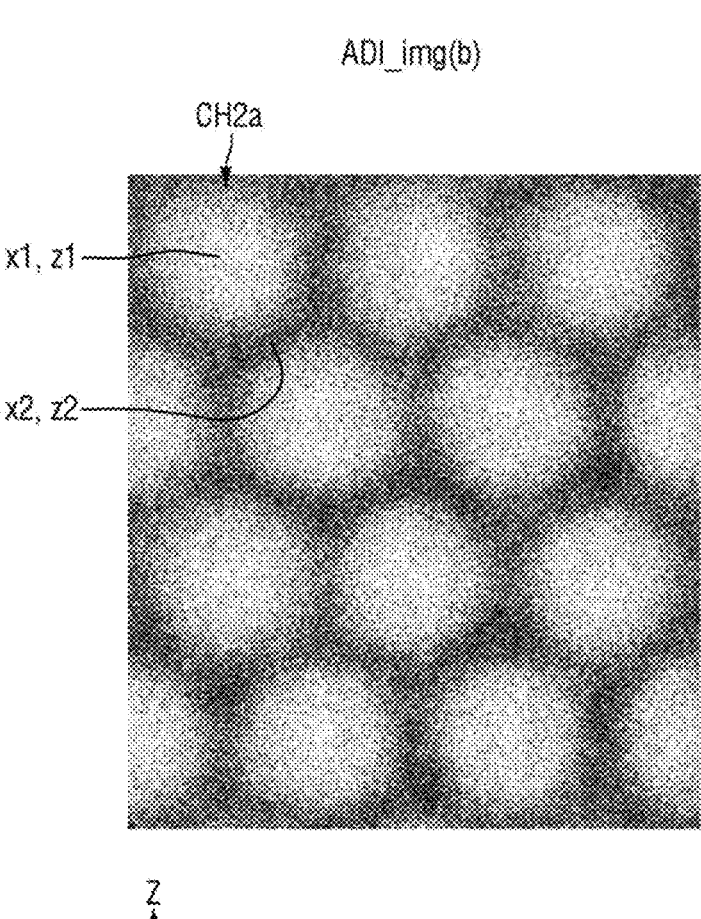
FIG. 6 is a top view of a semiconductor device at some steps of the process steps for the semiconductor device showing the ADI image as an example, according to some embodiments.

FIG. 6 is a top view of a semiconductor device at some steps of the process steps for the semiconductor device showing the ADI image as an example.

Referring to FIGS. 5 and 6, the top view ADI_img(b) of the semiconductor device of FIG. 5 may include a plurality of channel holes.

The top view ADI_img(b) may be or represent, for example, an image obtained through a SEM or an image obtained through a TEM.

The channel hole CH2*a* may be or correspond to, for example, the channel hole CH2*a* of FIG. 5.

The top view ADI_img(b) is an image captured before the photoresist layer 118 is etched, and a noise due to the photoresist layer 118 may be generated.

That is, the edge between the plurality of channel holes may be not clear.

In embodiments, an edge detection operation for the top view ADI_img(b) may be performed for the line width measurement of the semiconductor device shown in FIG. 5. A diagram after the edge detection operation is performed on the top view ACI_img(b) is described with respect to FIG. 7.

Figure 7:
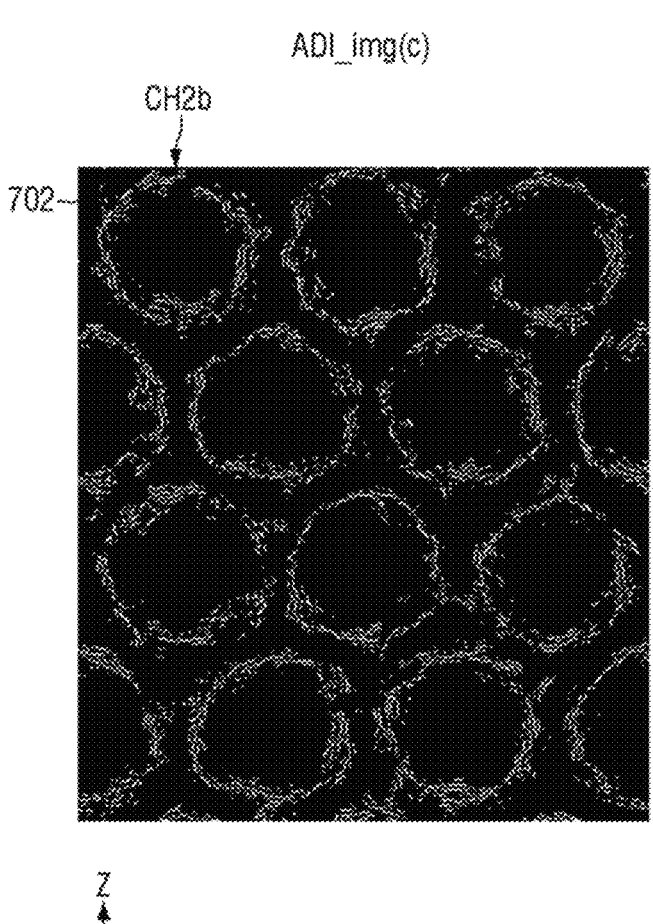
FIG. 7 is a top view showing an image in which an edge is detected by performing the edge detection operation on the image of FIG. 6, according to some embodiments.

FIG. 7 is a top view showing an image in which an edge is detected by performing the edge detection operation on the image of FIG. 6.

The edge detection operation may be performed on the basis of the brightness information depending on the position of the pixel of the top view ADI_img(b) of FIG. 6. Detailed description of an example of the edge detection operation is given with FIGS. 8 and 9 below.

Figure 8:
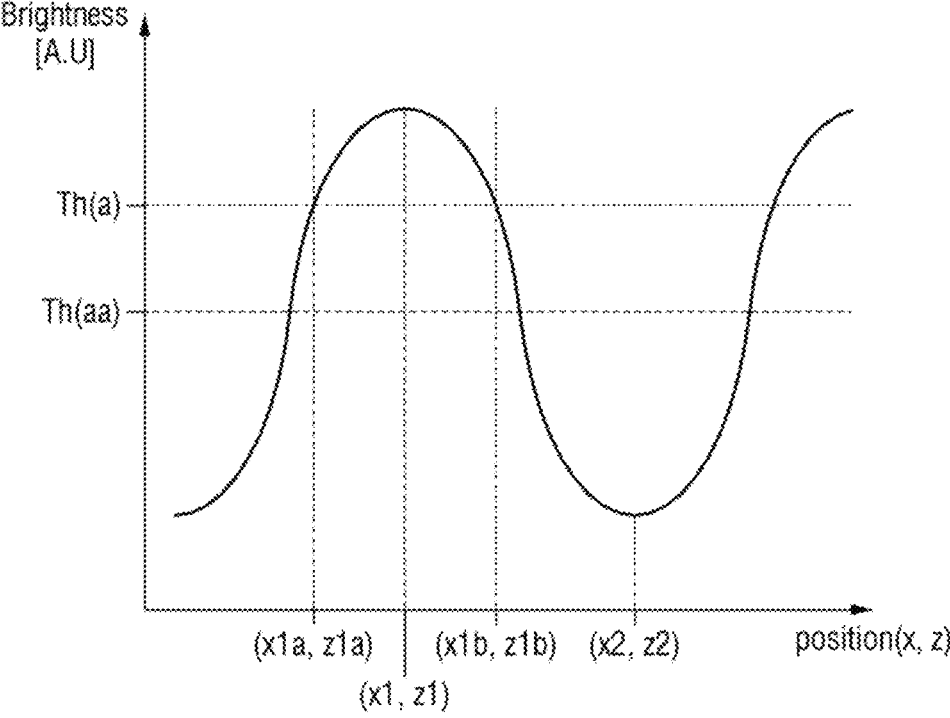
FIG. 8 is a graph showing changes in brightness depending on the position of the image of FIG. 6, according to some embodiments.

FIG. 8 is a graph showing changes in brightness depending on the position of the image of FIG. 6.

Referring to FIGS. 6 and 8, a brightness graph Graph I showing an example brightness according to pixel positions of the top view ADI_img(b) of FIG. 6 is shown.

Graph I is shown for convenience of explanation, and embodiments are not limited thereto. For example, Graph I may not exactly match the brightness depending on the pixel position of the top view ADI_img(b) of FIG. 6.

A horizontal axis of Graph I may represent the pixel position, for example a pixel position in first direction x and third direction z, of the top view ADI_img(b) of FIG. 6, and a vertical axis may represent brightness depending on position.

For example, among the pixels of the top view ADI_img (b) of FIG. 6, the brightness may appear as the brightest value at positions (x1, z1), and the brightness may appear as the lowest value at positions (x2, z2).

Figure 9:
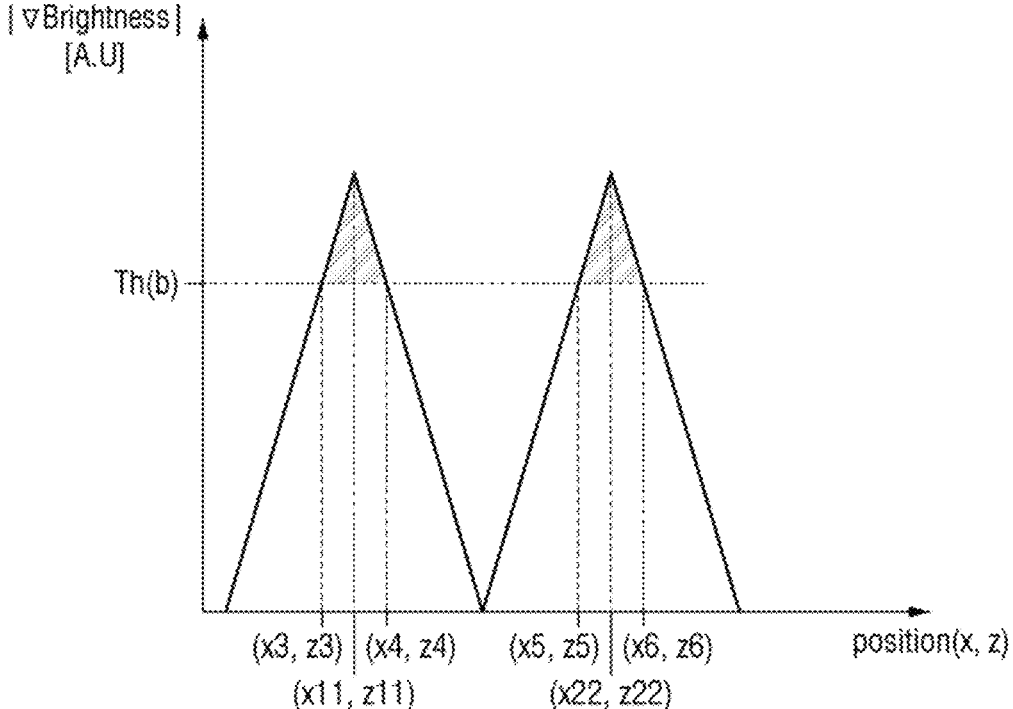
FIG. 9 is a graph showing gradient changes in brightness depending on the position of the image of FIG. 6, on the basis of the graph of FIG. 8, according to some embodiments.

FIG. 9 is a graph Graph II showing gradient changes in brightness depending on the position of the image of FIG. 6, on the basis of the graph of FIG. 8.

Graph II is shown for convenience of explanation, and may not exactly match the gradient value along the horizontal axis of Graph I of FIG. 8.

Referring to FIGS. 6, 8, and 9, Graph II of FIG. 9 is a graph obtained by taking an absolute value of the gradient value for Graph I of FIG. 8.

More specifically, Graph II of FIG. 9 is a graph obtained by applying the absolute value to the gradient value of Graph I of FIG. 8 which is a graph of brightness depending on the pixel position of the top view ADI_img(b) of FIG. 6.

Referring to the Graph II of FIG. 9, for example, it is possible to have the greatest values at positions (x11, z11) and positions (x22, z22). The greatest values may mean that the brightness change at the position (x11, z11) and the position (x22, z22) is maximum, and may mean that this may become an edge which enters from the outside of the channel hole to the inside of the channel hole.

However, the top view ADI_img(b) of FIG. 6 includes a relatively large amount of noise, and there may be a case where the edge of the channel hole is not clear. Margin for defining the edge may be set for such cases. The margin value may be defined as a threshold gradient value Th(b). The threshold gradient value Th(b) may be a value defined by a user who processes the image.

For example, the threshold gradient value Th(b) may be set to perform the edge detection operation on the top view ADI_img(b) of FIG. 6. In embodiments, the positions of pixels whose gradient values depending on the pixel positions of the top view ADI_img(b) of FIG. 6 have values greater than the threshold gradient value Th(b) may be defined as the edge of the top view ADI_img(b) of FIG. 6.

That is, the pixels between positions (x3, z3) and positions (x4, z4) in Graph II of FIG. 9 and the pixels between positions (x5, z5) and positions (x6, z6) may be defined as the pixels at which the edge of the top view ADI_img(b) of FIG. 6 is located.

A diagram showing the edge detected on the basis of this may be an image ADI_img(c) of FIG. 7.

Subsequently, referring to FIG. 7, the edge 702 detected on the basis of the brightness information depending on the position of the pixel of the top view ADI_img(b) of FIG. 6 is displayed in the image ADI_img(c). That is, the image ADI_img(c) may be displayed by being divided into two regions or portions, for example an edge portion and a non-edge portion.

In embodiments, the image ADI_img(c) is an image generated on the basis of the top view ACI_img(b) of FIG. 6, and since the top view ADI_img(b) of FIG. 6 is an image which is captured before etching the photoresist layer 118 and in which a noise due to the photoresist layer 118 is generated, the edge defining the plurality of channels may not appear clearly.

In order to check in more detail the edge that define the plurality of channels, the position at which the channel hole CH2*b* exists will be explained below with respect to FIG. 10.

Figure 10:
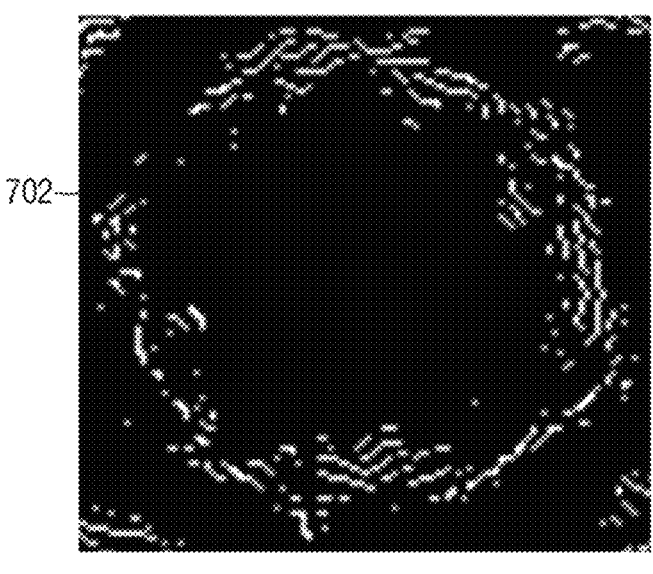
FIG. 10 is an enlarged view showing a part of the image of FIG. 7, according to some embodiments.
Figure 10:
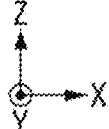

FIG. 10 is an enlarged view showing a part of the image ADI_img(c) of FIG. 7.

Referring to the image of FIG. 10, the edge 702 that defines the channel hole CH2*b* may be not clear. More specifically, it may be understood that the edge for defining the channel hole CH2*b* has an open curved shape.

This is because the top view ADI_img(b) of FIG. 6 is an image which is captured before the photoresist layer 118 is etched, and in which noise due to the photoresist layer 118 is generated.

In the examples described with respect to FIGS. 6 to 9, the measurement accuracy of line widths, and more particularly of line widths of the channel hole, may be low.

In other words, when the top view includes a relatively large amount of noise and the edge of the image generated after the edge detection is not clear, the measurement accuracy of the line width, more specifically the line width of the channel hole, may be lowered. In this case, it may be possible to improve the measurement accuracy of the line width, more particularly the line width of the channel holes through the image processing system or image processing method according to some embodiments.

Example configurations and operations for increasing the measurement accuracy of line widths, more specifically, line widths of channel holes, through the image processing system or the image processing method according to some embodiments are described in detail below.

Figure 11:
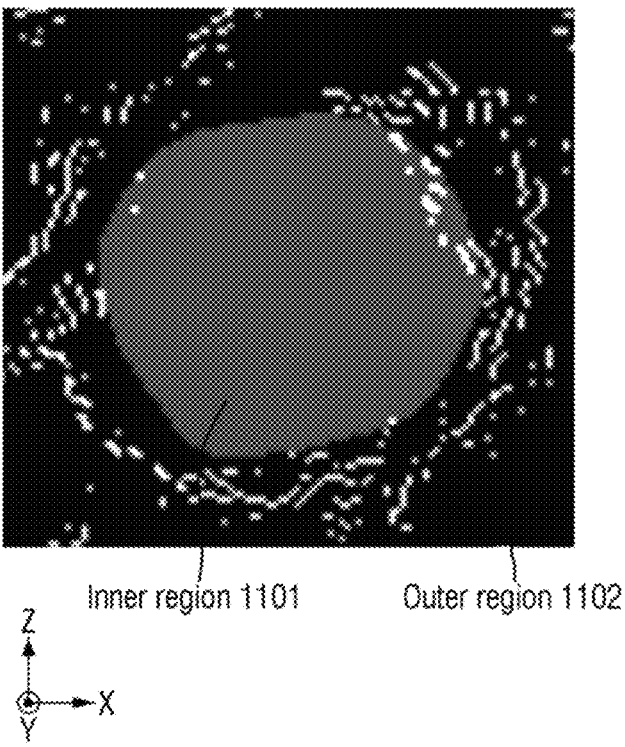
FIG. 11 is a diagram showing an image obtained by performing the image binarization operation on the image of FIG. 6, according to some embodiments.

FIG. 11 is a diagram showing an image obtained by performing an image binarization operation on the image of FIG. 6.

Referring to FIG. 11, the image binarization image ADI_img(d)_1 obtained by performing the image binarization operation on the image ADI_img(b) of FIG. 6 subjected to the edge detection operation is shown.

An example of the image binarization operation is described with respect to FIG. 8.

Referring to FIGS. 6, 8 and 11, a user who processes the image on the image ADI_img(b) of FIG. 6 may define the threshold brightness Th(a).

That is, for the image binarization operation on the image ADI_img(b) of FIG. 6, by dividing the pixel positions of the image ADI_img(b) of FIG. 6 into a region having brightness equal to or greater than the threshold brightness Th(a) and a region having no brightness, the image ADI_img(b) of FIG. 6 may be divided into two regions.

For example, in Graph I, depending on the position of the pixel of the top view ADI_img(b) of FIG. 6, pixels having brightness higher than the threshold brightness Th(a) and pixels not having brightness may be dividedly displayed.

That is, in Graph I, depending on the position of the pixels of the top view ADI_img(b) of FIG. 6, by dividing the pixels (for example pixels located between positions (x1a, z1a) and the positions (x1b, z1b)) having brightness greater than the threshold brightness Th(a) and the pixels having no brightness, a binarized image obtained by binarizing the top view ADI_img(b) of FIG. 6.

The binarized image thus generated may be expressed as in FIG. 11, according to embodiments.

Referring to FIG. 11, the top view ADI_img(b) of FIG. 6 may be binarized to binarize the region. An edge inner region, for example inner region 1101, and an outer region, for example outer region 1102, may be defined accordingly In embodiments, the inner region and the outer region of the top view ADI_img(b)) of FIG. 6 may be changed by adjusting the threshold brightness Th(a).

An example of this will be described with respect to FIG. 12.

Figure 12:
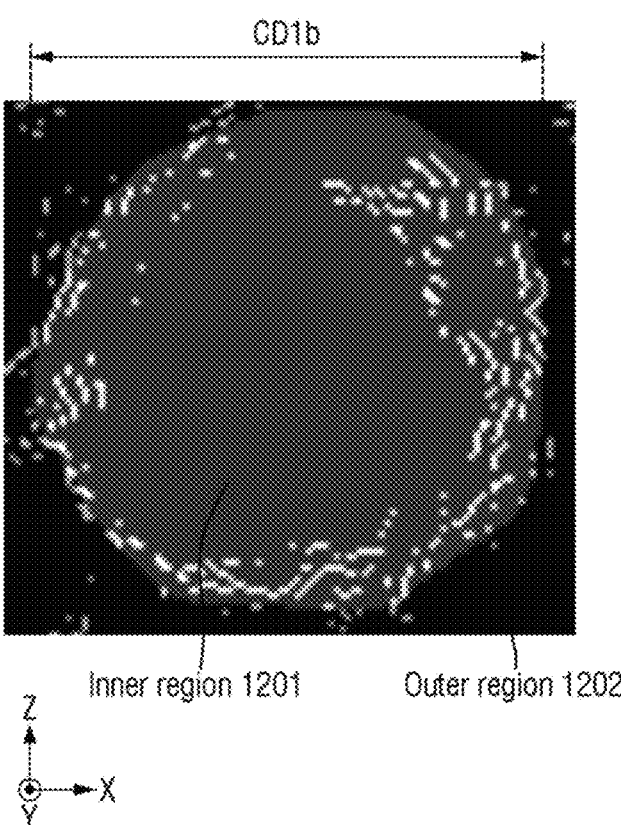
FIG. 12 is a diagram showing another image in which the image binarization operation is performed on the image of FIG. 6, according to some embodiments.

FIG. 12 is a diagram showing another image in which the image binarization operation is performed on the image of FIG. 6.

Referring to FIGS. 6, 8 and 12, an example will be described in which the threshold brightness Th(aa) is set by the user who processes the image.

In this case, an area defined as the inner region may become larger than a case where the user sets the threshold brightness Th(a).

That is, the inner region 1201 in the binarized image ADI_img(d)_2 of FIG. 12 may be wider than the inner region 1101 in the binarized image ADI_img(d)_1 of FIG. 11.

In other words, the outer region 1202 of the binarized image ADI_img(d)_2 of FIG. 12 may be narrower than the outer region 1102 of the binarized image ADI_img(d)_1 of FIG. 11.

A method for setting a threshold brightness in the image processing system or image processing method according to some embodiments will be described.

The edge 702 that makes up the channel hole CH2*b* may be generated through the edge detection operation through FIG. 10. The edge generated through the edge detection operation may be made up as in the image ADI_img(c) of FIG. 7.

The binarized images ADI_img(d)_1, ADI_img(d)_2 described in FIGS. 11 and 12 may also overlap the pixels of the image ADI_img(c) of FIG. 7, and the inner region and the outer region may be dividedly displayed.

That is, as in the binarized image ADI_img(d)_1) of FIG. 11, the inner region 1101 may include fewer edge.

In embodiments, as in the binarized image ADI_img(d)_2 of FIG. 12, the inner region 1201 includes more edge than the inner region 1101 of the binarized image ADI_img(d)_1 of FIG. 11.

The threshold brightness set in Graph I of FIG. 8 may be adjusted on the basis of the number of edges included in the inner region.

More specifically, a ratio value may be defined between the number of edges included in the inner region generated through the binarized image and the number of all edges detected through the edge detection operation.

In embodiments, as in Equation 1 below, the ratio value may be defined as a value obtained by dividing the number of edges included in the inner region by the number of all edges in the image (e.g., the image ADI_img(c) of FIG. 7) detected through the edge detection operation.

Ratio value=(number of edges included in inner region)/(number of all edges detected)   (Equation 1)

That is, the threshold brightness may be adjusted depending on the ratio value defined by the user who processes the image.

In embodiments, the image processing system or the image processing method according to some embodiments finds the threshold brightness which satisfies the ratio value, while reducing the threshold brightness from a high value to a low value to find a threshold brightness that satisfies the ratio value defined by the user, for example by approaching or equaling the ratio value defined by the user.

For example, when the user defines the ratio value to 0.5, the ratio value after setting the threshold brightness to a very high value is measured. In embodiments, when the ratio value is 0.1, the ratio value is measured after the threshold brightness is increased a little. In embodiments, when the ratio value is 0.3, the threshold brightness is further increased to measure the ratio value. The threshold brightness is increased as described above, and the threshold brightness when the ratio value initially reaches 0.5 is obtained.

The image processing system or the image processing method according to some embodiments may adjust the ratio value to measure the exact line width. This will be described with respect to FIG. 13 below.

Figure 13:
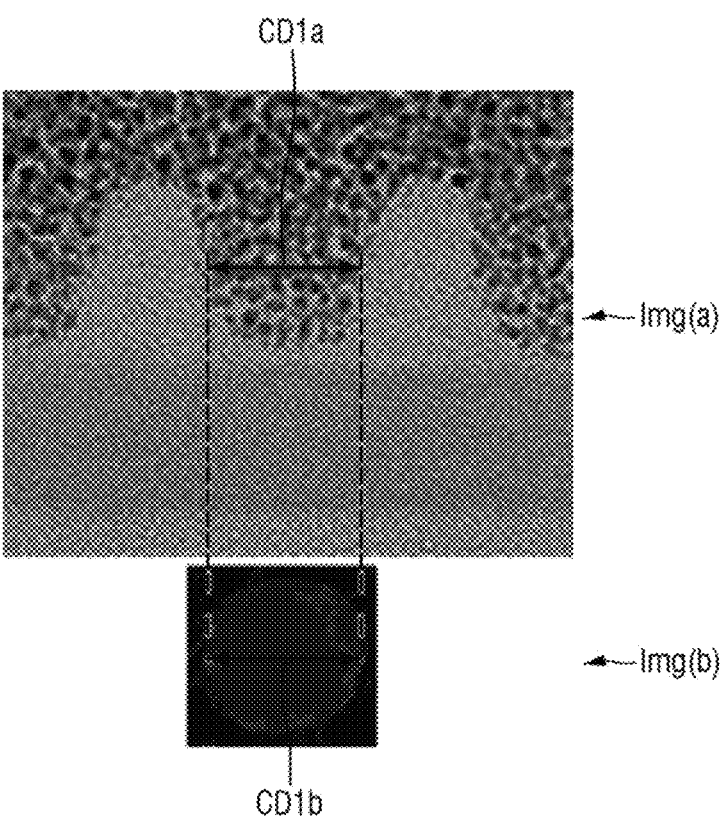
FIG. 13 is a diagram for explaining targets for which the image processing system according to some embodiments compares and learns the line widths through the machine learning, according to some embodiments.

FIG. 13 is a diagram for explaining targets for which the image processing system according to some embodiments compares and learns the line widths through the machine learning.

FIG. 13 illustrates an embodiments in which the binarized image ADI_img(d)_2 of FIG. 12 may be obtained by setting the ratio value to 0.5.

The image processing system or image processing method according to some embodiments measures the line width CD1*b* through the inner region 1201 of the binarized image ADI_img(d)_2 of FIG. 12.

In embodiments, the image Img(b) may be a top view image at the first height P1 of the image ADI_img(a) during some step processes of the multiple process steps of fabricating the semiconductor device of FIG. 5.

Further, the image Img(a) may be a cross-section obtained by taking the image ADI_img(a) in some step processes of the plurality of process steps for fabricating the semiconductor device of FIG. 5 in the second direction y and viewing the image in the third direction z.

The images Img(a) and Img(b) may be or represent, for example, images obtained through a SEM or images obtained through a TEM.

The image processing system or the image processing method according to some embodiments measures a line width CD1*a* at a first height P1 of the image Img(a). Additionally, the image processing system or the image processing method according to some embodiments measures a line width CD1*b* of the image Img(b).

The image processing system or the image processing method according to some embodiments performs learning through machine learning, until the correlation between the line widths CD1*a* and CD1*b* is maximized.

Although the machine learning may be performed through, for example, an artificial neural network (ANN), the machine learning performed by the image processing system or the image processing system method according to some embodiments is not limited thereto.

In the image processing system or the image processing method according to some embodiments, the data which is learned and generated through the machine learning may be stored in the memory to build a database.

That is, the image processing system or the image processing method according to some embodiments may continuously learn a ratio value at which the correlation between the line width CD1a and the line width CD1b is maximized, in the process of performing the learning until the correlation between the line width CD1a and the line width CD1b is maximized, through the machine learning.

The learned data in this process may be stored in the memory, and a database may be constructed.

That is, the database constructed by the image processing system or the image processing method according to some embodiments may be helpful in improving the reliability of line width measurements during some step processes of the multiple process steps for fabricating the semiconductor device.

Figure 14:
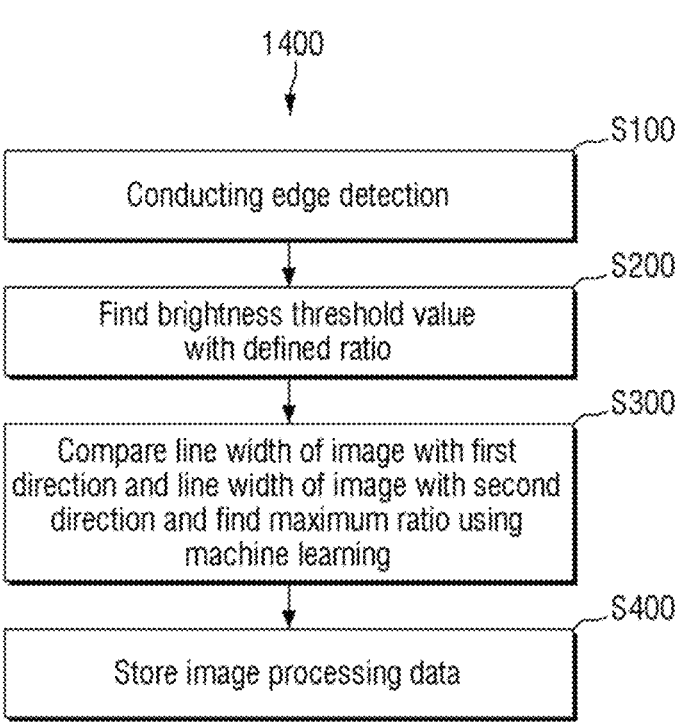
FIG. 14 is a flow chart for explaining an image processing method according to some embodiments.

FIG. 14 is a flow chart for explaining an image processing method 1400 according to some embodiments;

Hereinafter, some description which may be redundant or duplicative of description given above may be briefly explained.

Referring to FIG. 14, the image processing method according to some embodiments may perform an edge detection operation on the top view at some heights for a semiconductor device at operation S100.

Subsequently, the learning may be performed through the machine learning, until the correlation between a dimension corresponding to view in a first direction and a dimension corresponding to a view in a second direction intersecting the first direction is maximized at operation S200. In embodiments, the dimension may be a line width, the view in the first direction may be a top view, the view in the second direction may be a side view, and the correlation may be expressed as a ratio between a first line width and a second line width.

Image processing data (e.g., learned data) generated in the image processing process described above may be stored in the memory at operation S300.

Figure 15:
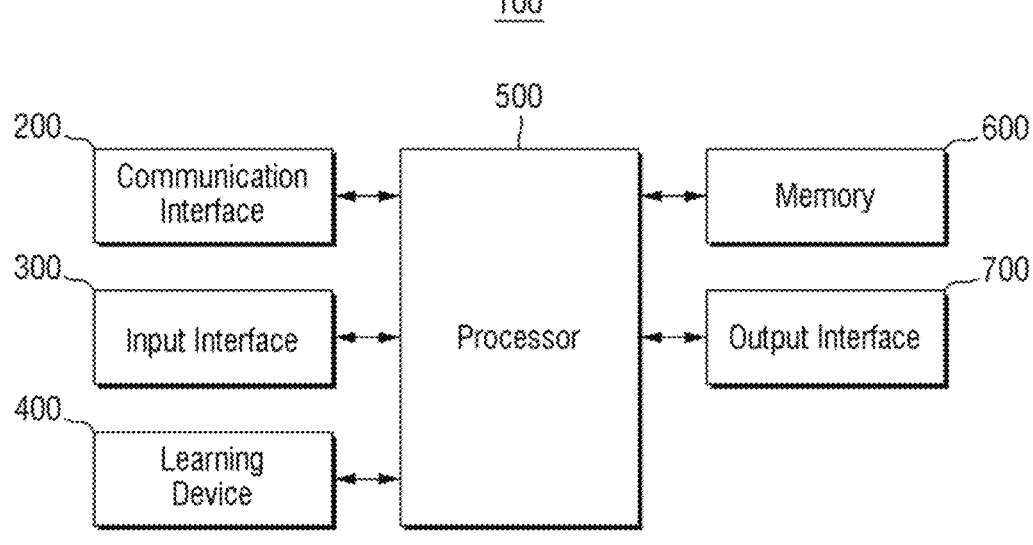
FIG. 15 is an exemplary diagram for describing an image processing system according to some embodiments.

FIG. 15 is an exemplary diagram for describing an image processing system according to some embodiments.

Referring to FIG. 15, the image processing system 100 according to some embodiments may be implemented as, for example, a fixed apparatus or a mobile apparatus such as a TV, a projector, a mobile phone, a smart phone, a desktop computer, a notebook, a digital broadcasting terminal, a personal digital assistants (PDA), a portable multimedia player (PMP), a navigation, a tablet PC, a wearable device, a set-top box (STB), a digital multimedia broadcasting (DMB) receiver, a radio, a desktop computer, a robot, and a vehicle.

The image processing system 100 may include a communication interface 200, an input interface 300, a learning device 400, a processor 500, a memory 600, and an output interface 700. The configuration of the image processing system 100 is not limited thereto, and other configurations may be further added.

The communication interface 200 may transmit and receive data to and from other external electronic devices (e.g., a device that processes images acquired through a SEM or a device that processes images acquired through a TEM, using wired/wireless communication technology. For example, the communication interface 200 may transmit and receive sensor information, user input, learned model, control signal, and the like to and from other external devices.

In embodiments, the communication technology used by the communication interface 200 may include, but not limited to, a GSM (Global System for Mobile communication), a CDMA (Code Division Multi Access), a LTE (Long Term Evolution), a 5G, a WLAN (Wireless LAN), a Wi-Fi (Wireless-Fidelity), a Bluetooth, a RFID (Radio Frequency Identification), an IrDA (Infrared Data Association), a Zig-Bee, a NFC (Near Field Communication), and the like.

The input unit 300 may acquire various types of data (e.g., the image (ACI_img(b)) of FIG. 2, the image (ADI_img(b)) of FIG. 6, or the image (Img(a)) of FIG. 13).

Various types of data acquired by the input unit 300 (e.g., the image (ACI_img(b)) of FIG. 2, the image (ADI_img(b)) of FIG. 6, or the image (Img(a)) of FIG. 13) may be data that are received by the communication interface 200 through other electronic devices (e.g. a device that processes images acquired through a SEM or a device that processes images acquired through a TEM).

In embodiments, the input interface 300 may include a camera for inputting or receiving video signals, a microphone for receiving audio signals, a user input unit for inputting or receiving information from a user, and the like. Here, the camera and the microphone are treated as sensors, and signals obtained from the camera and the microphone may also be called sensing data or sensor information.

The input interface 300 may acquire learned data for learning the machine learning model and/or input data (e.g., image ACI_img(b) of FIG. 2, the image ADI_img(b) of FIG. 6 or the image Img(a) of FIG. 13) to be used when acquiring the output using the machine learning learned model in the learning device 400.

The input interface 300 may obtain raw input data, and in this case, the learning device 400 may extract input feature as pre-processing on the input data received from the input interface 300.

For example, the input interface 300 may acquire an image during a semiconductor device and/or a semiconductor device fabricating process (e.g., a SEM image) and transmit it to the learning device 400.

The learning device 400 may learn a model made up of an artificial neural network using data (e.g., images) received from the input interface 300. Here, the learned artificial neural network may be called a learned model. The learned model may be used to estimate result values for new input data rather than learned data, and the estimated values can be used as the basis for decisions for performing arbitrary operations.

In embodiments, the learning device 400 may perform the machine learning processing through an internal learning processor.

In embodiments, the learning device 400 may be implemented, using an external memory directly coupled to the memory 600 or a memory held in an external device.

The output interface 700 may generate outputs related to sight, hearing, touch, and the like.

In embodiments, the output interface 700 may include a display unit that outputs visual information, a speaker that outputs auditory information, a haptic module that outputs tactile information, and the like.

The memory 600 may store data that supports various functions of the learning device 400. For example, the memory 600 may store input data, learned data, learned models, learned histories, and the like acquired by the input interface 300.

The memory 600 may include, for example, a non-volatile memory such as a NAND flash.

The learned model may be used to infer result values for new input data rather than the learned data, and the inferred values can be used as the basis for decisions to perform arbitrary operations.

The processor 500 may control the overall operations of the image processing system 100. The processor 500 may also obtain intent information about the user input and determine user's requirements on the basis of the obtained intent information. Further, the processor 500 may control at least some of the constituent elements of the learning device 400 to drive application programs stored in the memory 600. Further, the processor 500 may operate two or more of the constituent elements included in the learning device 400 in combination with each other to drive the application program.

For example, processor 500 may perform the edge detection operation and/or the image binarization operation described above.

Figure 16:
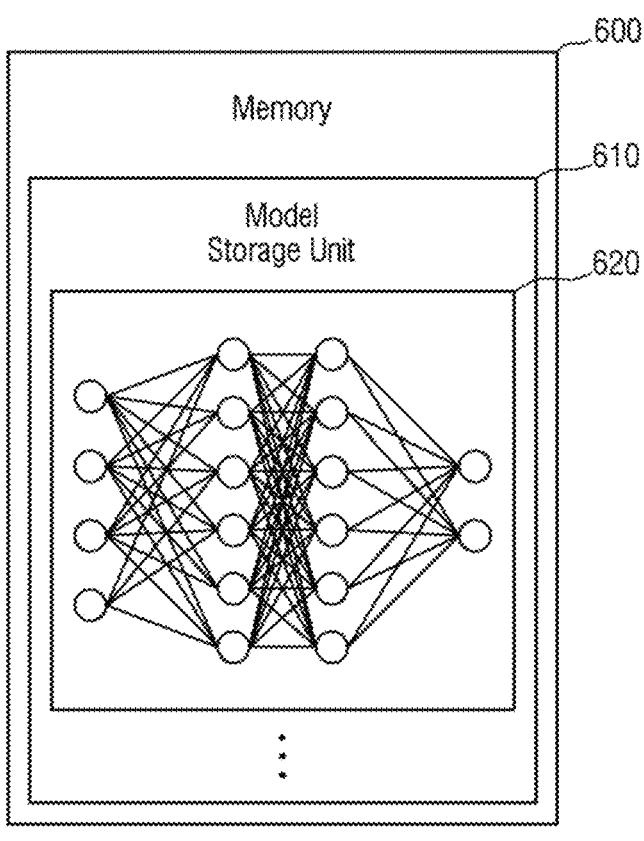
FIG. 16 is an exemplary diagram for describing the memory of the image processing system according to some embodiments.

FIG. 16 is an exemplary diagram for describing the memory of the image processing system according to some embodiments;

Referring to FIGS. 15 and 16, the memory 600 may include a model storage unit 610. The model storage unit 610 may store a model 620, which may be for example an artificial neural network, and which may be learned or has been learned through the learning device 400.

Referring to FIGS. 15 and 16 described above, the learning device 400 learns an image of a semiconductor device (e.g., a SEM image) provided through the input interface 300, and may measure the line width, using the learned model.

Although embodiments of the present disclosure have been described above with reference to the accompanying drawings, it will be understood by those of ordinary skill in the art that the present disclosure is not limited thereto and may be implemented in many different forms without departing from the technical idea or essential features thereof. Therefore, it should be understood that the embodiments set forth herein are merely examples in all respects and not restrictive.

What is claimed is:

1. An image processing system comprising:

at least one processor; and a memory configured to store one or more instructions which, when executed by the at least one processor, cause the image processing system to:

receive a first direction image corresponding to a view of a semiconductor device in a first direction, and a second direction image corresponding to a view of the semiconductor device in a second direction which intersects the first direction at a first height at which the first direction image is generated, perform an edge detection operation for detecting an edge based on the first direction image, perform an image binarization operation on the first direction image, compare a first line width obtained based on the image binarization operation, and a second line width obtained based on the second direction image through machine learning, and learn a condition of the image binarization operation which maximizes a correlation between the first line width and the second line width.

2. The image processing system of claim 1,
wherein the memory is further configured to store the condition of the image binarization operation.

3. The image processing system of claim 1, wherein the one or more instructions, when executed by the at least one processor, further cause the image processing system to:

communicate with an external device which generates the first direction image and the second direction image.

4. The image processing system of claim 1, wherein the first direction image and the second direction image are obtained using a scanning electron microscope (SEM) or a transmission electron microscope (TEM).

5. The image processing system of claim 1, wherein the edge detection operation is performed based on a gradient value obtained by applying a gradient to brightness information about pixels of the first direction image.

6. The image processing system of claim 5, wherein the edge detection operation determines pixels in which the gradient value is greater than a threshold gradient value, to be the edge.

7. The image processing system of claim 1, wherein the image binarization operation determines pixels having a brightness greater than a threshold brightness to be an inner region, based on brightness information about pixels of the first direction image.

8. The image processing system of claim 7, wherein the at least one processor is further configured to:

calculate an edge detection ratio value by dividing a number of edges included in the inner region by a total number of edges detected in the first direction image; and perform the image binarization operation such that the edge detection ratio value is equal to a predetermined edge detection ratio value.

9. An image processing system comprising:

at least one processor; and a memory configured to store a machine learning model for performing machine learning, and one or more instructions which, when executed by the at least one processor, cause the image processing system to:

receive a first direction image corresponding to a view of a semiconductor device in a first direction, and a second direction image corresponding to a view of the semiconductor device in a second direction intersecting the first direction at a first height at which the first direction image is generated;

perform the machine learning based on the first direction image and the second direction image;

wherein to perform the machine learning, the one or more instructions which, when executed by the at least one processor, cause the image processing system to:

perform an edge detection operation for detecting an edge based on the first direction image, perform an image binarization operation on the first direction image, compare a first line width obtained based on the image binarization operation with a second line width obtained based on the second direction image using the machine learning, and learn a condition of the image binarization operation at which a correlation between the first line width and the second line width is maximized by performing the machine learning.

10. The image processing system of claim 9, wherein the memory is further configured to store the condition of the image binarization operation.

11. The image processing system of claim 9, wherein the first direction image and the second direction image are obtained using a scanning electron microscope (SEM) or a transmission electron microscope (TEM).

12. The image processing system of claim 9, wherein the edge detection operation is performed based on a gradient value obtained by applying a gradient to brightness information about pixels of the first direction image.

13. The image processing system of claim 12, wherein the edge detection operation determines pixels in which the gradient value is greater than a threshold gradient value, to be the edge.

14. The image processing system of claim 9, wherein the image binarization operation determines pixels having brightness greater than a threshold brightness to be an inner region, based on brightness information about pixels of the first direction image.

15. The image processing system of claim 9, wherein the one or more instructions, when executed by the at least one processor, further cause the image processing system to:

calculate an edge detection ratio value obtained by dividing a number of edges included in an inner region by a total number of edges detected in the first direction image; and perform the image binarization operation such that the edge detection ratio value is equal to a predetermined edge detection ratio value.

16. An image processing method comprising:

receiving a first direction image corresponding to a view of a semiconductor device in a first direction, and a second direction image corresponding to a view of the semiconductor device in a second direction intersecting the first direction at a first height at which the first direction image is generated through an input interface;

performing an edge detection operation for detecting an edge based on the first direction image, using a processor;

performing an image binarization operation on the first direction image, using the processor; and comparing a first line width obtained based on the image binarization operation, and a second line width obtained based on the second direction image using machine learning, and learning a condition of the image binarization operation which maximizes a correlation between the first line width and the second line width, using a learning device.

17. The image processing method of claim 16, wherein the edge detection operation is performed based on a gradient value obtained by applying a gradient to brightness information about pixels of the first direction image.

18. The image processing method of claim 17, wherein the edge detection operation determines pixels in which the gradient value is greater than a threshold gradient value, to be the edge.

19. The image processing method of claim 16, wherein the image binarization operation determines pixels having brightness greater than a threshold brightness to be an inner region, based on brightness information about pixels of the first direction image.

20. The image processing method of claim 19, wherein an edge detection ratio value is obtained by dividing a number of edges included in the inner region by a total number of edges detected in the first direction image, and wherein the image binarization operation is performed such that the edge detection ratio value is equal to a predetermined edge detection ratio value.

21. The image processing system of claim 1, wherein the condition specifies a relationship between the image binarization operation and at least one edge detected using the edge detection operation.

\*    \*    \*    \*    \*